United States Patent [19]

Cohodar

[11] Patent Number: 5,012,335

[45] Date of Patent: Apr. 30, 1991

[54] OBSERVATION AND RECORDING SYSTEM FOR A POLICE VEHICLE

[76] Inventor: Alija Cohodar, P.O. Box 380074, Miami, Fla. 33138

[21] Appl. No.: 211,996

[22] Filed: Jun. 27, 1988

[51] Int. Cl.$^5$ .......................... H04N 7/18; H04N 5/30

[52] U.S. Cl. .................................... 358/108; 358/125; 358/229; 354/81; 354/293

[58] Field of Search ............... 358/108, 125, 210, 229; 354/81, 293; 356/107 UP

[56] References Cited

U.S. PATENT DOCUMENTS

| | | | |
|---|---|---|---|
| 3,176,602 | 4/1965 | Wilt | 354/293 |
| 3,634,008 | 1/1972 | Plummer et al. | 358/125 |
| 4,067,015 | 1/1978 | Mogavero et al. | 358/125 |
| 4,233,634 | 11/1980 | Adams | 358/108 |
| 4,420,238 | 12/1983 | Felix | 358/229 |
| 4,728,839 | 3/1988 | Coughlan et al. | 358/108 |

*Primary Examiner*—John K. Peng

*Attorney, Agent, or Firm*—Charles J. Prescott

[57] ABSTRACT

A system which includes a video camera and video recording assembly electrically powered and disposed within a police vehicle for the viewing of exterior, surrounding areas of the vehicle for the purpose of recording events or activity within a predetermined field of view. The video camera is automatically operable to view and record the activities of selected police personnel during movement exterior of the vehicle or be manually positioned by police personnel located within the vehicle and further wherein the camera may be removed from its coupling and support structure associated with the vehicle for remote carrying by police personnel and observation and recording of activities, outside of the vehicle and out of normal visual range thereof.

11 Claims, 2 Drawing Sheets

OBSERVATION AND RECORDING SYSTEM FOR A POLICE VEHICLE

BACKGROUND OF THE INVENTION

It is generally well accepted that crime including both minor and major violations of the law is on the rise. Accordingly, the police officer normally traveling alone in a police vehicle, such as an automobile, is placed in increasingly demanding situation wherein both his safety is in jeopardy and his activity would preferably require close monitoring.

Alarming statistics are available relating to the death or serious injury of police officers by suspects by performing normal police activities. Typically, an automobile may be stopped for what may be considered a minor or normal traffic violation. When the police officer leaves his vehicle to inspect or interview the person stopped, he sometimes encounters dangerous situations where the motorist is retaliatory or unbeknownst to the police officer has committed a major felony and attempts to escape sometimes after attempting to harm or kill the police officer.

There is an obvious need therefore for an observation and/or viewing and recording system associated with the police vehicle and which is at least in part remote to the extent that the policeman's activity outside the vehicle can be readily observed and recorded by means of a video camera and like video equipment. Such a preferred system could be utilized in addition to the police officer's safety to render his activities more efficient and accurate when used as evidence. For example the vehicle's license plate and/or description could be accurately recorded if later required. Also, the specific activities between the officer and the suspect would be permanently recorded thereby dispelling any counterclaims for police abuse.

SUMMARY OF THE INVENTION

The present invention relates to a system for viewing the activity of a police officer in the vicinity surrounding the police vehicle. The system includes a video camera mounted on the interior of the vehicle on a mounting means which includes a coupling specifically structured to allow both vertical and horizontal movement and positioning of the video camera in an exposed position relative to the surrounding vicinity of the police vehicle.

In addition, the camera is such that it may be removed from the mounting means or bracket securing it to the vehicle and carried with police officers such as when he leaves the vehicle and travels out of viewing range or into an interior location.

An electrical supply serves to interconnect the camera, for its electrical powering, to the electrical power source of the vehicle itself. However, a rechargeable battery or battery pack assembly may be secured as part of the camera or as an ancillary component thereof such that the video camera may be carried with specific police personnel for viewing and recording, on video cassette or applicable tape, events happening some distance from the vehicle.

The system further incorporates a video recording means as part of the camera or as a separate component thereof which may be remotely mounted relative to the camera but specifically electrically connected thereto. In typical and well known fashion, the video recording means is electrically connected to the camera so as to receive any video signals therefrom and record such signals on video cassette, tape, etc. Modern day video camera apparatus, however, very frequently incorporates a recording assembly as part of the camera itself such as in commercially available cameras known as "cam recorders."

Another feature of the present invention provides for the inclusion of a positioning means for automatically positioning the camera or more specifically the viewing lens thereof in an operable position relative to specific exterior vicinities of the vehicle. In a preferred embodiment to be described in greater detail hereinafter, a transmitter is carried on selected police personnel, such as the operator of a police vehicle. When activated, the transmitter will be carried with the police personnel and the camera will be automatically positioned to follow and continuously record the movements of the police personnel carrying the transmitter structure as well as the surrounding vicinity. By virtue of this feature, additional personnel need not be required to stay in the vehicle and operate the camera. As part of this positioning means a receiver structure or assembly is mounted on the video camera or in adjacent relation thereto and is connected to the mounting structure and/or the coupling which allows the camera free movement in the support bracket or like structure connected to the vehicle.

It should also be emphasized that manual positioning of the camera by personnel within the vehicle is also possible. Therefore, additional versatility is provided in the subject viewing and recording system by allowing both manual and automatic operation and/or positioning of the camera to view pre-selected areas exterior of the vehicle.

Another feature of the invention to be described in greater detail hereinafter is the provision that the activity or area being video recorded can be immediately reviewed to determine the content of the recording through typical view-finder structure associated with the camera wherein said camera type is commercially available. Concurrently, a permanent record will of course be maintained in the video cassette or video tape structure associated with the video recording means as described above.

It should be readily apparent therefore that one object accomplished by the recording and viewing system of the present invention is the provision and maintenance of a video record which may be reviewed instantaneously or at a later time and further wherein the viewing system may be operated by personnel within the police vehicle or automatically in the manner described above.

DETAILED DESCRIPTION OF THE PREFERRED EMBODIMENT

Figure 8:
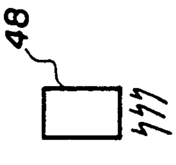
FIG. 8 is a schematic representation of components of the present invention.
Figure 8:
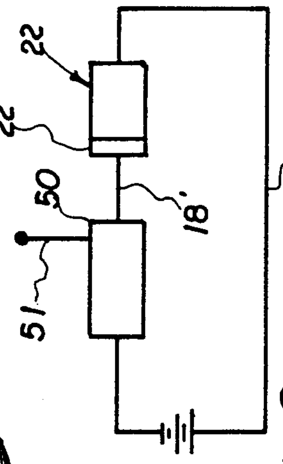

The present invention relates to a recording, review and/or observation system of the type to be used in combination with and as a safety feature in a police automobile type vehicle generally indicated as 10. The system includes a video camera 12 of the type including a basic housing 14 and a view finder 16 through which the scene being viewed can be automatically observed and/or being of the type wherein replay action can automatically be viewed when used in combination with some type of video recording means. Such a video recording means may be considered a part of the camera structure as in a camcorder type of device which are well known and commercially available. Alternately, the video recording means can be in the form of a conventional video cassette recorder (VCR) and be mounted at some convenient location within the vehicle such as in the trunk or the like. The video camera 12 is interconnected to the power supply of the vehicle by an elongated conductor cord 18 secured to the vehicle power supply by an electrical adaptor structure 20 which may fit into the cigarette lighter portion or in any other applicable fashion be connected to the electrical system.

A mounting means is generally indicated as 22 and includes an elongated substantially rigid material bracket 24 having a holder or support portion 26 disposed in a position preferably on the interior of the vehicle 10 so as to readily expose the camera 12 in a position which will allow the viewing the exterior vicinity surrounding the vehicle 10. More specifically, the support portion 26 of the mounting means 22 may be adapted to embrace an elongated mounting and/or support shaft 28 which may define a coupling type structure along with a coupling housing 30. The coupling and/or support shaft 28 and the coupling housing 30 may be specifically structured to be somewhat "universal" in operation in that the camera and more specifically the viewing lens thereof as at 35 may move in substantially both a horizontal direction and somewhat vertical direction of travel as indicated respectively by the directional arrows 37 and 39.

The elongated support shaft 28 may be mounted to the camera and adequately support the camera in its operative position for viewing, as set forth above. In order to properly position the camera relative to a preselected vicinity or sight to be viewed and recorded, a positioning handle 42 may be secured to the housing 14 so as to allow for manual positioning of the camera to the point where the viewing lens 35 is properly positioned. When such camera is properly positioned, the proper intended "scene" will appear of course in the view finder 16.

Also, an important feature of the present invention is the cooperative structuring of the mounting means 22 and the support bracket 26 relative to the elongated support shaft 28. Such cooperative structuring will allow the entire removal of the video camera 12 and the hand support or gripping of the camera by either certain inherent gripping features which are present in certain video cameras which are commercially available. In order to facilitate mounting but yet removal of the video camera 12 from the mounting or support bracket 26, a locking structure 41 may be mounted on or cooperatively structured with the mounting bracket 26 so as to ensure that the camera 12 and the support shaft 28 cannot be inadvertently or removed by unauthorized personnel from its mounted position within the interior of the vehicle 10. The locking structure 41 may be of a conventional key type lock assembly which also may be commercially available but which may be specifically structured to securely and engage and prevent unauthorized removal of the elongated shaft 28 from the position shown in the figures herewith.

Another important feature of the present invention include an audible or sound pick-up assembly generally indicated as 44 and including a microphone 46 which may be mounted directly on the camera housing 14 and be of the type known as a "directional" microphone. Such microphone may be structured to have sufficient sensitivity to pick up sound towards which the microphone 46 is directed. Such microphone is connected not only to the camera structure but to any video recording means associated with the camera as set forth above. Accordingly, such appropriately positioned and electrically interconnected video recording means will be of the type to pick up, receive and record for instantaneous and/or permanent and delayed playback any type of video and audio signal directed to it by the camera and microphone 46 or other audio pick-up means 44. Other embodiments contemplated in the scope of the present invention include the transmission of the video signal to a remote central headquarter or the like such that activity being conducted around the vehicle from which the signal is being transmitted may be simultaneously viewed at the headquarters. Obviously, certain antenna and transmission equipment known in the prior art would have to be associated therewith.

Figure 1:
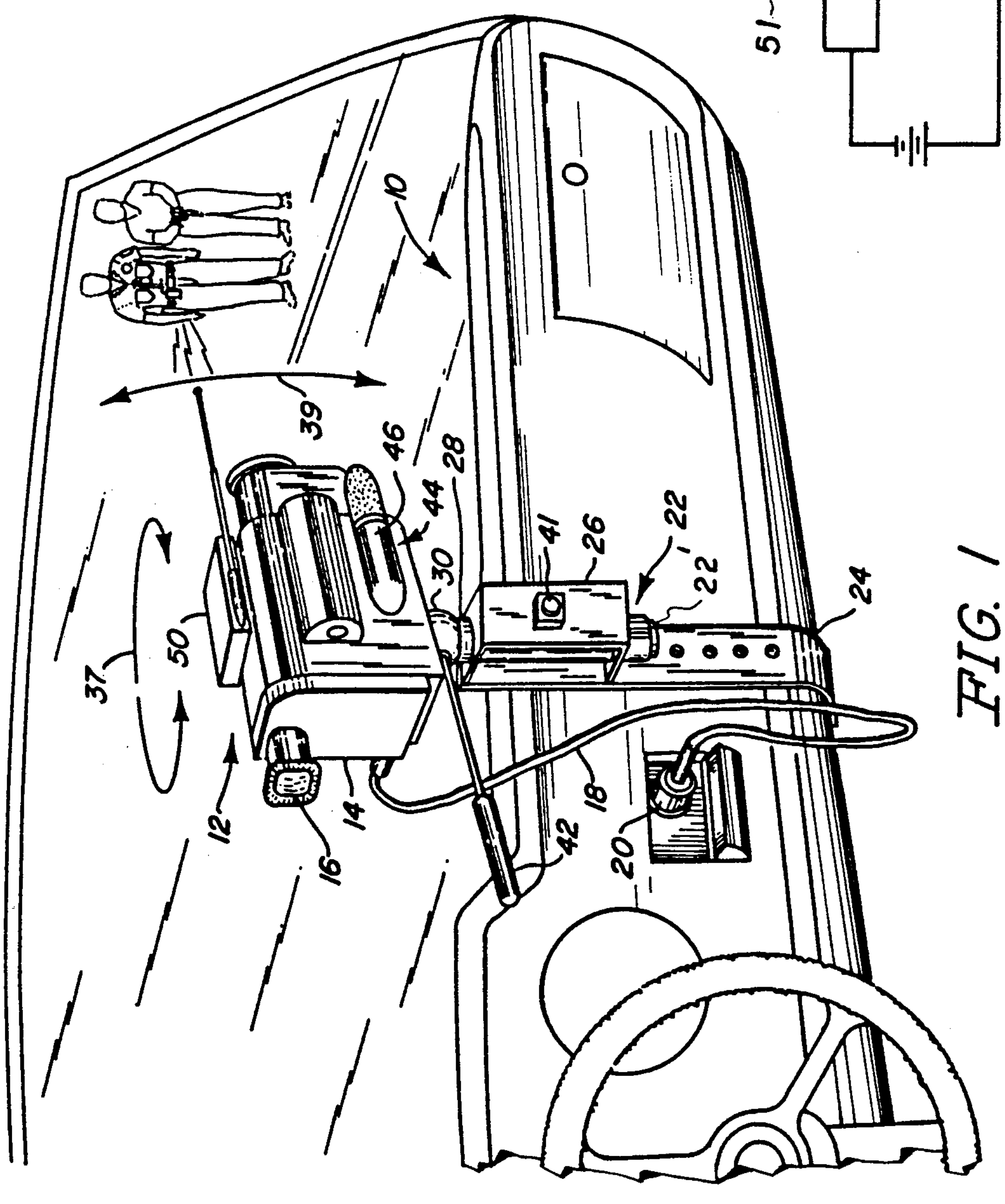
FIG. 1 is a perspective view in partial cut-away of the assembly of the present invention mounted in part on the interior of an automobile and associated with the various components thereof.
Figure 2:
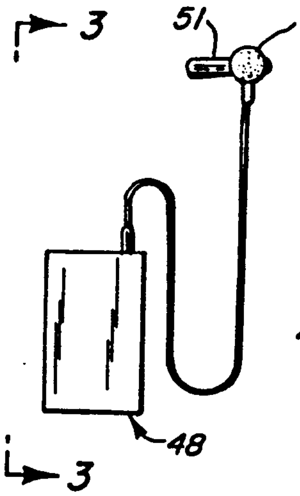
FIG. 2 is a front plane view of a transmitter component associated with the subject assembly.
Figure 3:
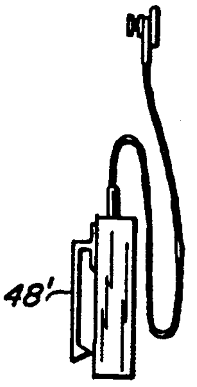
FIG. 3 is a side view along line 3—3 of FIG. 2.
Figure 4:
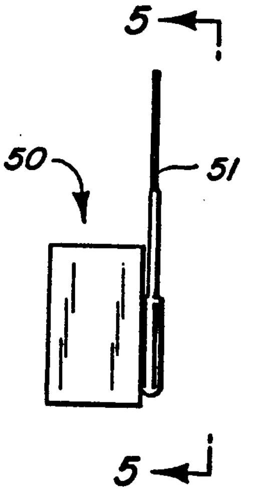
FIG. 4 is a front plane view of a receiver component associated with the present invention.
Figure 5:
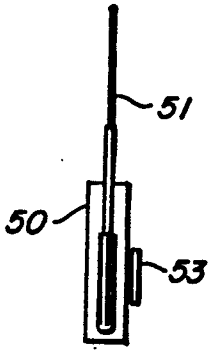
FIG. 5 is a side view along line 5—5 of FIG. 4.
Figure 6:
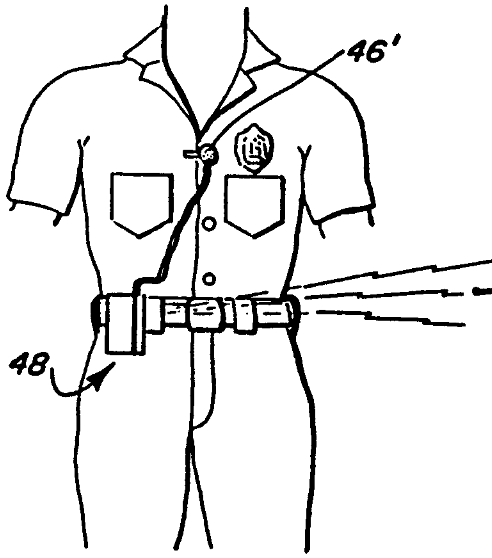
FIG. 6 is a perspective view in partial cut-away showing the transmitter component attached to authorized personnel and being remotely secured to a video camera and the receiving component attached thereto.
Figure 7:
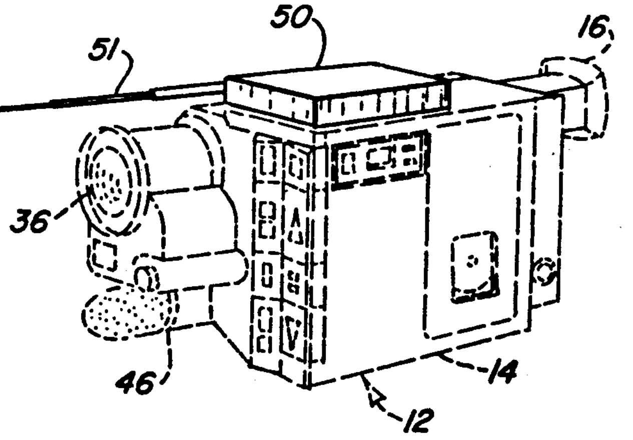
FIG. 7 is a perspective view in partial phantom lines showing mounting of the receiving component on the video camera associated with the subject assembly.

Another feature of the present invention is shown in the drawings herein. Such feature is directed towards a positioning means in the form of a transmitter generally indicated as 48 and a receiver generally indicated as 50. The transmitter is of the type which may work on infrared and/or radio frequencies and be carried with the selected police personnel as shown. Such transmitter is specifically structured to send positioning signals to a receiver 50 wherein the receiver may be mounted directly on the camera 14 in any convenient location and/or in adjacent operative relation thereto. Proper aerial or like structures may be incorporated especially if radio frequencies signals are in use rather than infrared or the like. The transmitter 48 and receiver 50 are such as to allow "automatic" remote control positioning of the camera and more specifically the viewing lens thereof 35 such that the personnel carrying the transmitter 48 will always be in the operative viewing scene being monitored by the video camera 12. This is true even when the police personnel travels or moves within an operable range of the camera 12. The camera will therefore effectively "follow" the position of the officer or personnel wearing the transmitter 48. This is accomplished of course due to the fact that the receiver may be electrically connected to send and/or transmit regulating or activating positioning signals to the mounting means and more specifically to the universal type coupling 30 associated with and being responsible for the positioning of the video camera 12 as well as the viewing lens 35 into a preferred position for viewing external vicinities or areas of the vehicle 10. As shown in both FIGS. 1 and 8, the above set forth electrical connection between the receiver 50 and the mounting means 22 is accomplished by a conventional electrical conductor 18' electrically connecting the receiver 50 to a portion of the mounting means 22 serving as a conventional drive means 22' which will physically manipulate or drive the coupling 30 in a manner which will cause its "automatic" positioning upon the reception of positioning signals by the receiver 50 from the transmitter 48 worn by the police officer (see FIG. 1). It should be understood that any conventional means accomplishing physical movement and/or manipulation of the mounting means 22 and may be utilized and, accordingly, such means 22' is schematically represented in FIG. 8 but not otherwise shown therein in detail. If a conventional source of electrical power, either associated directly with the vehicle or in battery form, as set forth above in detail, is shown as part of the schematic representation of FIG. 8 wherein the components are interconnected by a conventional conductor 18'.

Also associated with the transmitter 48 and which further serves to facilitate remote operation of the camera 12 is a microphone as at 46' which is mounted directly on the police personnel or other selected personnel designed to carry the transmitter and be continuously viewed by the video camera 12. Such microphone 46' may have an attachable clip or like connecting device 51 used to secure the microphone 46' in appropriate audible receiving location on the personnel carrying the transmitter means 48.

The positioning means including transmitter 48 and receiver 50 thereby allows for the automatic positioning of the video camera 12 when the police personnel leave the vehicle without necessitating the use of a second person to be maintained within the vehicle and operate the camera.

What I claim is:

1. A recording system to be used in combination with a police automobile or like vehicle, said system comprising:

a video camera disposed on the vehicle in an operative position sufficient to view surrounding exterior areas about the vehicle, mounting means secured to an interior of the vehicle and connected in supporting engagement to said video camera for mounting thereof in said operative position, said mounting means including a universal coupling movably connected to said video camera and structured for both substantially horizontal and vertical travel of the video camera and selective disposition relative to a preferred field of view exteriorly of the vehicle, said universal coupling further structured for removable attachment and support of said video camera on the vehicle, a power supply connected at least in part to said camera for the electrically powering thereof, and a positioning means mounted on selective personnel to be observed and on said video camera in connection with said mounting means and structured for automatically positioning said video camera for continuous viewing of the selected personnel while moving or stationary on the exterior of the vehicle.

2. The system of claim 1 further comprising an audio assembly including a microphone structure disposed and structured to receive sound within a field of view being observed by said video camera.

3. The system of claim 1 wherein said positioning means further comprises a remote transmitter assembly mounted on and carried with the selective personnel and a receiver assembly mounted in cooperative relation to said video camera and operatively connected to said mounting means for activation thereof and automatic positioning of said video camera for viewing of the selective personnel.

4. The system of claim 3 wherein said positioning means further comprises a portable microphone removably mounted on and carried with the selected personnel bearing said remote transmitter assembly.

5. The system of claim 4 further comprising an audio assembly including a microphone structure disposed and structured to pick up sound within a field of view being observed by said video camera, said microphone structured for remote operation relative to said video camera and mounted on the selected personnel bearing said remote transmitter assembly.

6. The system of claim 1 wherein said power supply means comprises a portable battery assembly mounted on and carried with said video camera, said portable battery assembly structured to electrically power said video camera when removed from one vehicle.

7. The system of claim 6 wherein said power supply means comprises an electrical adaptor structure removably interconnecting said video camera to an electrical energy source of the vehicle.

8. The system of claim 1 wherein said mounting means further comprises a lock assembly mounted on said universal coupling and structured to secure said video camera to the vehicle.

9. The system of claim 1 further comprising a video recording means electrically connected to said video camera and structured to record video input from said video camera for storage and retrieval thereof.

10. The system of claim 9 further comprising an audio assembly including a microphone structure disposed and structured to receive sound within a field of view being observed by said video camera, said microphone structure connected to said video recording means for recording both video and audio signals from said video camera.

11. The system of claim 1 wherein said mounting means is structured for both manual and automatic positioning of said video camera independent of one another.

* * * * *